Dec. 6, 1949     H. C. SCHILDMEIER     2,490,233
LIFT STRUCTURE FOR TIRES
Filed March 30, 1948
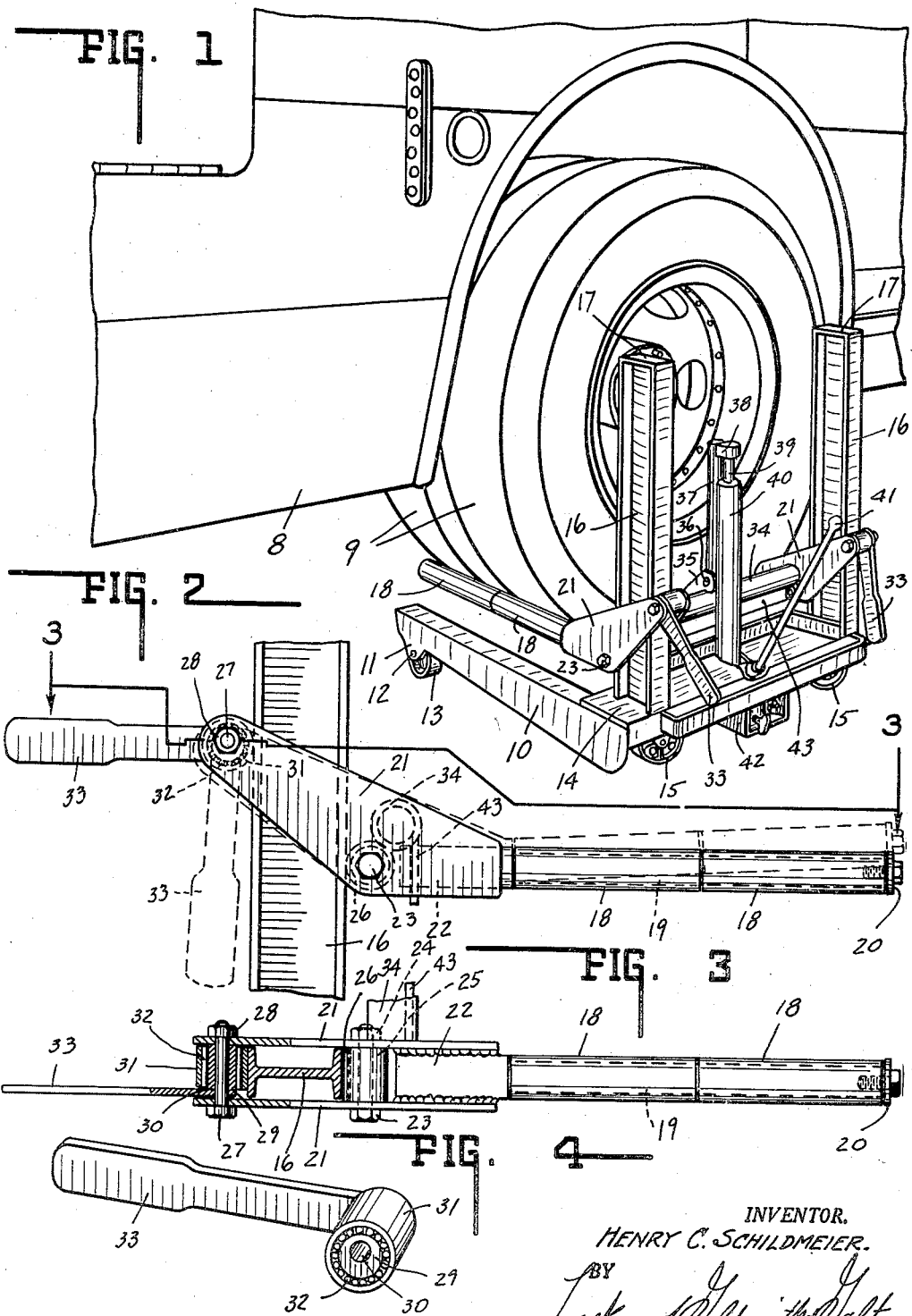
INVENTOR.
HENRY C. SCHILDMEIER.
BY
Lockwood, Goldsmith & Galt,
ATTORNEYS.

Patented Dec. 6, 1949

2,490,233

UNITED STATES PATENT OFFICE 2,490,233

LIFT STRUCTURE FOR TIRES

Henry C. Schildmeier, Indianapolis, Ind.

Application March 30, 1948, Serial No. 17,853

7 Claims. (Cl. 214—1)

This invention relates to a tire and wheel lift structure more particularly and is directed more especially to structures of the general class represented by the Patents No. 1,306,431 dated June 10, 1919 and No. 2,217,898 dated October 15, 1940.

The chief object of the present invention is to provide lifting mechanism upon a portable base, which lifting structure can be elevated to the desired elevation and then tilted to the desired degree clockwise or counter-clockwise for accurately disposing a tired wheel for mounting thereof, and conversely such support structure can be accurately applied to a tired wheel and to facilitate the removal thereof from a vehicle.

The chief feature of the present invention resides in providing upon a portable base at least a pair of uprights and associating therewith a generally U-shaped tired wheel support or tire support and interposing between said base and support a raising and lowering mechanism and associating with said support an additional adjustable connection for tilting of the support as desired or required.

Other objections and features of the invention will be set forth more fully hereinafter.

The full nature of the invention will be understood from the accompanying drawings and the following description and claims.

In the drawings,

Fig. 1 is a perspective view of the invention with a dual tire wheel structure being applied to a vehicle.

Fig. 2 is an enlarged side elevational view of a portion of the invention, dotted lines indicating a second position of certain of the parts.

Fig. 3 is a combination plane and sectional view taken on line 3—3 of Fig 2 and in the direction of the arrows.

Fig. 4 is a perspective view of the eccentric mount.

In the drawings, 8 indicates a vehicle to which a pair of tired wheels 9 is being applied, the same being supported by a tire and wheel support structure, the latter being, in turn, carried by a base or carriage structure, the last two mentioned embodying the invention.

In Fig. 1 of the drawings, 10 indicates a channel and it is to be understood there is a pair of said channels and in the free ends there is rotatably mounted in the depending ears 11 and upon axle 12 a caster wheel 13. A transverse connecting portion 14 connects the pair of channels together at the other ends and the under side of said portion 14 has suitably secured to it, the swivelling caster structures of which the caster wheels 15 only are shown. These are commonly known as swivelling plate casters and are so called because the horn is topped by a plate and the plate in turn is suitably secured to a horizontal member.

Extending upwardly from the member 14 at opposite ends and, therefore, at two adjacent corners of the U-shaped resulting base structure, are a pair of uprights 16 having an I or H section, same being capped and closed as at 17 at the upper ends.

Disposed in parallel relation to each other, as it were, and parallel to the inverted channels 10 of the base, are the tire supporting elements and herein the same comprises a plurality of sleeve type rollers 18 that are disposed in longitudinal alignment on an arm 19 and are retained thereon as indicated at 20. This is at the free end of that arm. The other end of the arm is suitably secured between a pair of plates 21 which straddle the upright 16, the arm structure being suitably secured as indicated at 22.

Forwardly of the upright or standard and contiguous thereto and supported by the pair of plates 21 is a bolt 23 retained by nut 24. Rollers 25 rotatably support a hardened cylinder 26 which is adapted to bear on the front face of the upright 16. Disposed rearwardly of the upright 16 and extending across plates 21 and through the same is the bolt 27, anchored by nut 28. Rotatable thereon is a sleeve 29 and the latter has its bolt receiving bore 30 disposed eccentrically with respect to the central axis of the sleeve. A hardened tubular roller or sleeve 31, envelops the same and therebetween is provided a plurality of roller bearings 32. The sleeve 31 is not longitudinally coextensive with the eccentric sleeve 29 and terminates short thereof.

A handle 33 is rigid with said sleeve 29. The outer hardened sleeve 31 is adapted to bear on the rear face of the upright 16.

There is suitably secured to the two upright straddling yokes previously described, a transverse connection 34. Immediately therebetween is secured a bracket member 35 having what might be termed a horizontal pivot 36 which pivotally supports the upwardly extending member 37. The latter at its upper end pivotally supports the member 38, the pivotal support herein being transverse with respect to the pivot 36.

Rigid with the member 38 is a piston rod 39 that extends downwardly into a vertically disposed cylinder structure 40 carried by member 14. Within the cylinder is disposed a piston and this piston is subjected to fluid pressure by means of the movable handle 41 through mechanism disposed within the housing 42 depending from the cross member 14. This, in effect, constitutes a hydraulic jack.

When desired or required for stiffening purposes, the brace member 43 may be provided. What might be termed the tire support structure is raised and lowered through the handle 41 of the hydraulic jack structure and the controls. In so doing, the rollers fore and aft of the upright roll up and down on the uprights.

When the tired wheels are positioned as shown in Fig. 1 and it is desired to rotate the same, this can easily be effected by hand turning since sleeves 18 rotate upon the spindles 19. Note each tire engages a pair of parallel sleeves 18. Thus a pair of tired wheels when unattached can be individually or reversely rotated to bring the bolt holes of both into registration.

When the handle is up, it will be obvious that the roller sleeve 31 will be closer to the adjacent face of the upright. When the handle is down, it will be farther removed therefrom. When the handle is neutrally positioned, the roller will be disposed in an intermediate position with reference to the two preceding positions and the spindles 19 will be horizontally disposed.

When wheel assemblies are "stuck" upon axles through damaged brake linings or rust, a chain can be applied to the wheel and the lift post and then the device operated to "snake" or jerk loose the stuck wheel.

In applying wheels, after effecting registration as aforesaid, the handles 33 are actuated to tilt the wheels up or down as required to permit sliding of said wheels upon the axle thereby preventing damage to the brake linings and grease seals, etc.

The structure aforesaid accordingly affords accurate positioning of the tired wheels for mounting purposes and with a minimum of manual labor for a device of this character is capable of raising and lowering a ton and a half can be readily moved about with that load thereon and can accurately position wheel assemblies for mounting as described.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a lift structure having a base, a pair of spaced uprights at a pair of adjacent corners, and a U-shaped support, the combination therewith of manually controlled raising and lowering mechanism carried by the base and pivotally connected to the support, said support having opposed rollers engaging each upright, an eccentric mounting for one of each opposed pair of rollers, and a manual actuator for rocking each mounting to effect support tilting upon the pivotal axis.

2. A structure as defined by claim 1 wherein the raising and lowering mechanism comprises an upwardly disposed centrally positioned piston and cylinder device having its upper end pivotally connected to the support.

3. A structure as defined by claim 1 wherein each upright includes a pair of spaced fore and aft disposed bearing faces of appreciable width, the forward face engaging rollers having coaxial bearing pivots and the aft face engaging rollers having the eccentrically disposed mountings.

4. A structure as defined by claim 1 wherein each manual actuator is independent of the other for selective positioning of the same.

5. A structure as defined by claim 1 wherein the base is substantially U-shaped, the uprights being disposed contiguous to the junctions of the arms and the mid-portion of said base.

6. A structure as defined by claim 5 wherein casters are disposed at the free ends of the arms and contiguous to the junctions.

7. A structure as defined by claim 6 wherein the junction casters are of swivelling plate type, and the arms are of inverted channel formation with caster wheels carried between the channel sides near the free ends thereof.

HENRY C. SCHILDMEIER.

No references cited.